United States Patent [19]

Friberg

[11] 4,266,123
[45] May 5, 1981

[54] AUTOMATIC SCANNER

[75] Inventor: Nelson Friberg, Toledo, Ohio

[73] Assignee: Owen-Illinois, Inc., Toledo, Ohio

[21] Appl. No.: 962,576

[22] Filed: Nov. 20, 1978

[51] Int. Cl.$^3$ .............................................. G01J 1/32
[52] U.S. Cl. ................................... 250/205; 250/548; 315/158
[58] Field of Search ............... 250/205, 548; 315/158, 315/151; 226/45

[56] References Cited

U.S. PATENT DOCUMENTS

| | | | |
|---|---|---|---|
| 3,421,005 | 1/1969 | Baker | 315/158 |
| 3,631,250 | 12/1971 | Van Buskirk | 250/205 |
| 3,775,617 | 11/1973 | Dubauskas | 250/205 |
| 3,796,866 | 3/1974 | McClellan | 250/205 X |
| 4,040,740 | 8/1977 | Handtmann et al. | 250/205 X |

Primary Examiner—David C. Nelms
Assistant Examiner—Darwin R. Hostetter
Attorney, Agent, or Firm—M. E. Click; D. T. Innis; D. H. Wilson

[57] ABSTRACT

Disclosed is a scanner system which includes a light source and a photodetector. Circuitry is included for automatically adjusting the intensity of the light source so as to prevent saturation of the photodetector. Whenever the current through the photodetector exceeds a predetermined amount, a transistor switch is opened to connect a resistor in series with the light source and cause the intensity of the light source to decrease. When the output of the photodetector reduces due to decreased intensity of the light source, the transistor switch will close and thus cause the resistor to be bypassed and the intensity of the light source to return to its original level.

The scanner is utilized to detect reference marks which are located on a contrasting background. Additional circuitry included to adjust the sensitivity of the system so as to be able to detect marks of varying contrast with respect to the background. A mark is determined to be present by detecting a predetermined amount of change in the output of the photodetector over a certain time period, which represents the change in reflectivity between a mark and the background. If the change in the photodetector exceeds the second predetermined level, a portion of the photodetector output is automatically shunted to ground, with a result that a greater change in the output in the photodetector is required to trigger the detection portion of the circuit. The portion of the output of the photodetector which is shunted is passed through a variable resistance. The resistance is determined by connecting one or more of a plurality of resistors into the shunt path by means of a multiplexer, the addressing of which is controlled by a counter.

10 Claims, 3 Drawing Figures

AUTOMATIC SCANNER

BACKGROUND AND SUMMARY OF THE INVENTION

In the manufacture of composite cans, several inner layers of material and an outer printed label are spirally wound around a mandrel in order to form a composite tube. The tube moves down the mandrel and is cut into lengths, called sticks, by means of a pair of knives carried on a reciprocating carriage which moves in synchronization with the tube. The motion of the carriage is synchronized with that of the tube by tracking the motion of the printed label before it is wound on the mandrel and controlling the motion of the carriage as a function of the label travel. The label motion is tracked by detecting the passage of a plurality of evenly spaced reference marks, called eyemarks, past on inspection point. The eyemarks are located on a track which contrasts with the color of the eyemarks. A scanner is used to detect a passage of the eyemarks by responding to a change in the amount of light which is reflected from the eyemarks with respect to the amount of light which is reflected from the contrasting track. Such scanners are well known in the art and include a light source which projects light towards the track and a photodetector which receives light which is reflected from the track. The output of the scanner is a function of the amount of light received by the photodetector.

In prior art scanning systems, the output of the photodetector is fed to a circuit which generates a pulse whenever an eyemark is detected. The prior art scanners however, are generally designed to work only for a particular color of eyemarks and track. If different colors are to be utilized, the scanner must be adjusted or switched whenever a new color is to be used, due to different reflectivities of different colors. Composite cans are presently manufactured with many different color combinations for the track and eyemarks. Often, these combinations will be run on the same machine, i.e., a job change will require a new label to be run on a machine which was previously running with a different type of label. With such a change, the prior art scanners have to be adjusted or switched so as to accomodate the different color combinations. For example, many labels are printed with white tracks and black eyemarks. If it is desired to run a label having a blue track and white eyemarks, the scanner must be adjusted to compensate for the different reflectivities between the two labels.

The present invention is a scanner which includes a circuit that enables the scanner to be utilized with a wide range of color combinations. It adjusts itself automatically depending upon the average reflectivity of the surface and depending upon the amount of contrast between the track and eyemarks. Whenever too much light is being reflected back to the photodetector, the intensity of the scanner light source is automatically reduced, so as to prevent saturation of the photodetector. In order to detect the passage of an eyemark the circuit determines when a change in the amount of light received by the photodetector exceeds a predetermined value. This transistion represents the change between the track and an eyemark. If the contrast between the track and the eyemark is very large, the change in the output of the photodetector will be correspondingly large and will exceed a second predetermined value and automatically cause the circuit to reduce its sensitivity. Thus, the circuit automatically adjusts itself depending upon the reflectivity of the surface and depending upon the contrast between the track and the eyemarks. The circuit also includes means for resetting itself to maximum sensitivity whenever a a predetermined time period passes without the sensing of an eyemark.

DESCRIPTION OF THE PREFERRED EMBODIMENT

Figures 1, 2:
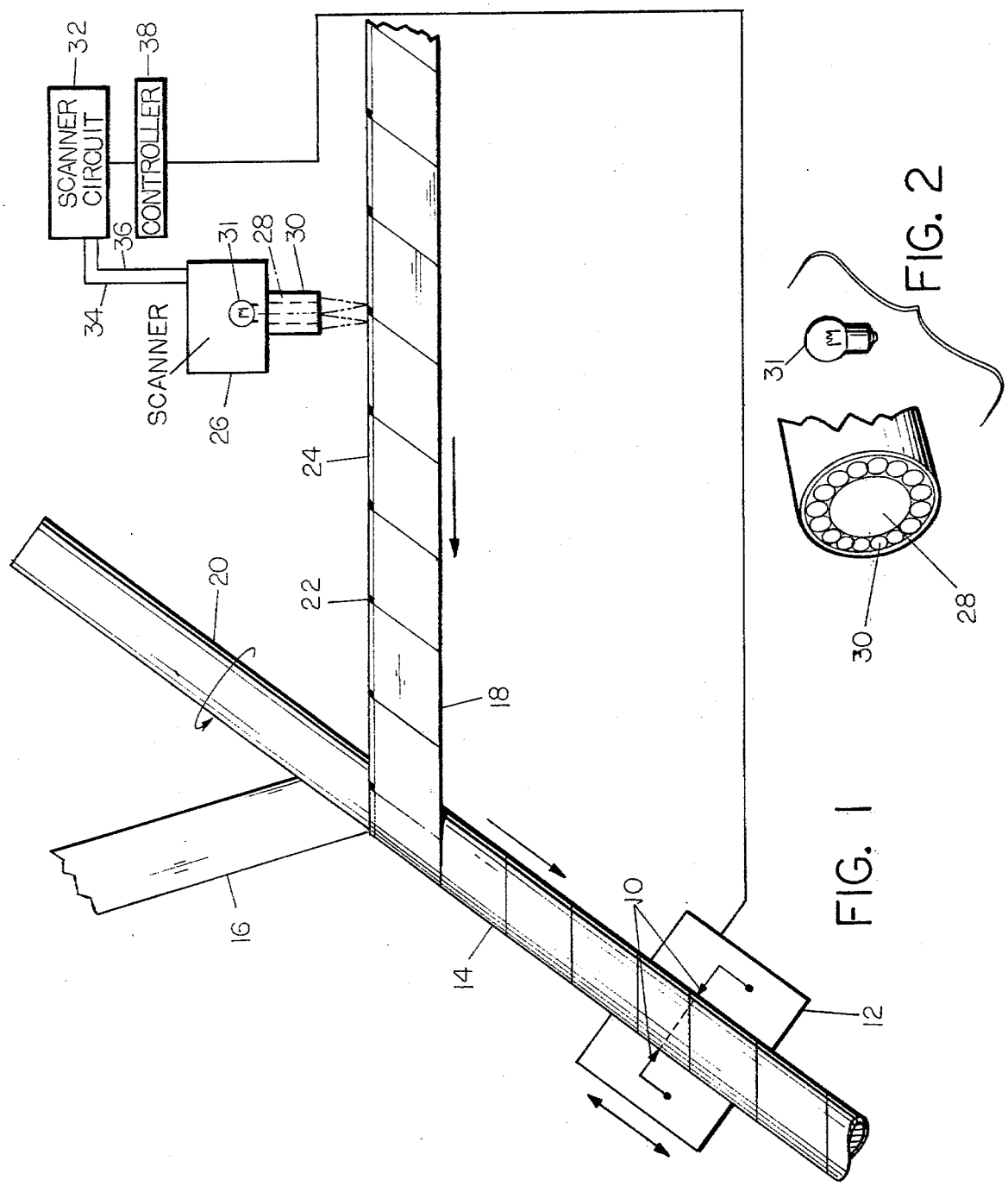
FIG. 1; is a schematic view of a composite tube forming and cutoff machine.
FIG. 2 is a perspective view of a scanner utilized in the present invention.

Referring to FIG. 1, a pair of knives 10 which are carried on a reciprocating carriage 12 are utilized to sever lengths, called sticks, from a spirally wound composite tube 14. The tube 14 is formed by winding one or more layers of inner material 16 and a printed label 18 around a mandrel 20. In order to facilitate cuts which are in register with the printed label 18, it is necessary to synchronize the motion of the carriage 12 with that of the tube 14. This is done by tracking the motion of the label 18 before it is wound on the mandrel 20 and synchronizing its motion with that of the carriage 12 (taking into account a scale factor). The motion tracking is accomplished by detecting the passage of evenly spaced reference marks, called eyemarks 22, past an inspection point.

The label 18 has a track 24 located along one of its edges, and a plurality of evenly spaced contrasting eyemarks 22 located on the track 24. The only requirement with respect to the colors of the eyemarks 22 and track 24 are that they be contrasting. Typical color combinations include black eyemarks on a white track, and a white or black eyemarks on a silver foil track. The passage of the eyemarks 22 is detected by a scanner 26. One scanner 26 which may be utilized is a Skan-a-matic model S35203 scanner.

The scanner 26 includes a photosensor or diode 28 and a plurality of fiber optic tubes 30 which transmit light from a lamp 31 towards the track 24. The construction of the scanner 26 may be seen more clearly by reference to FIG. 2. Light which is reflected from the track 24 or eyemarks 22 is picked up by the photosensor 28, and the variation of the amount of light which is reflected is utilized to detect the passage of eyemarks 22. The coaxial arrangement of the photosensor 28 and the fiber optic tubes 30 is not entirely necessary, i.e., a point source of light could be utilized. However, if the track 24 has a metallic or foil surface, wrinkles on the track 24 may cause the projected light to be reflected away from the photosensor 28 The use of the coaxial light source arrangement permits the projecting of light towards the track 24 from a plurality of directions, (i.e., the track 24 is "bathed" in light), thus insuring that light will be reflected back towards the photosensor 28 even if the track 24 is wrinkled.

The scanner 26 is connected to a scanner circuit 32 via two lines 34 and 36. Each time the scanner circuit 32 determines that an eyemark 22 has passed by the scanner position a short pulse is sent to a registration control system 38. The control system 38 is conventional in the art and utilizes the pulses from the scanner circuit 32 to control the motion of the carriage 12 so as to insure accurate cut to label registration.

Figure 3:
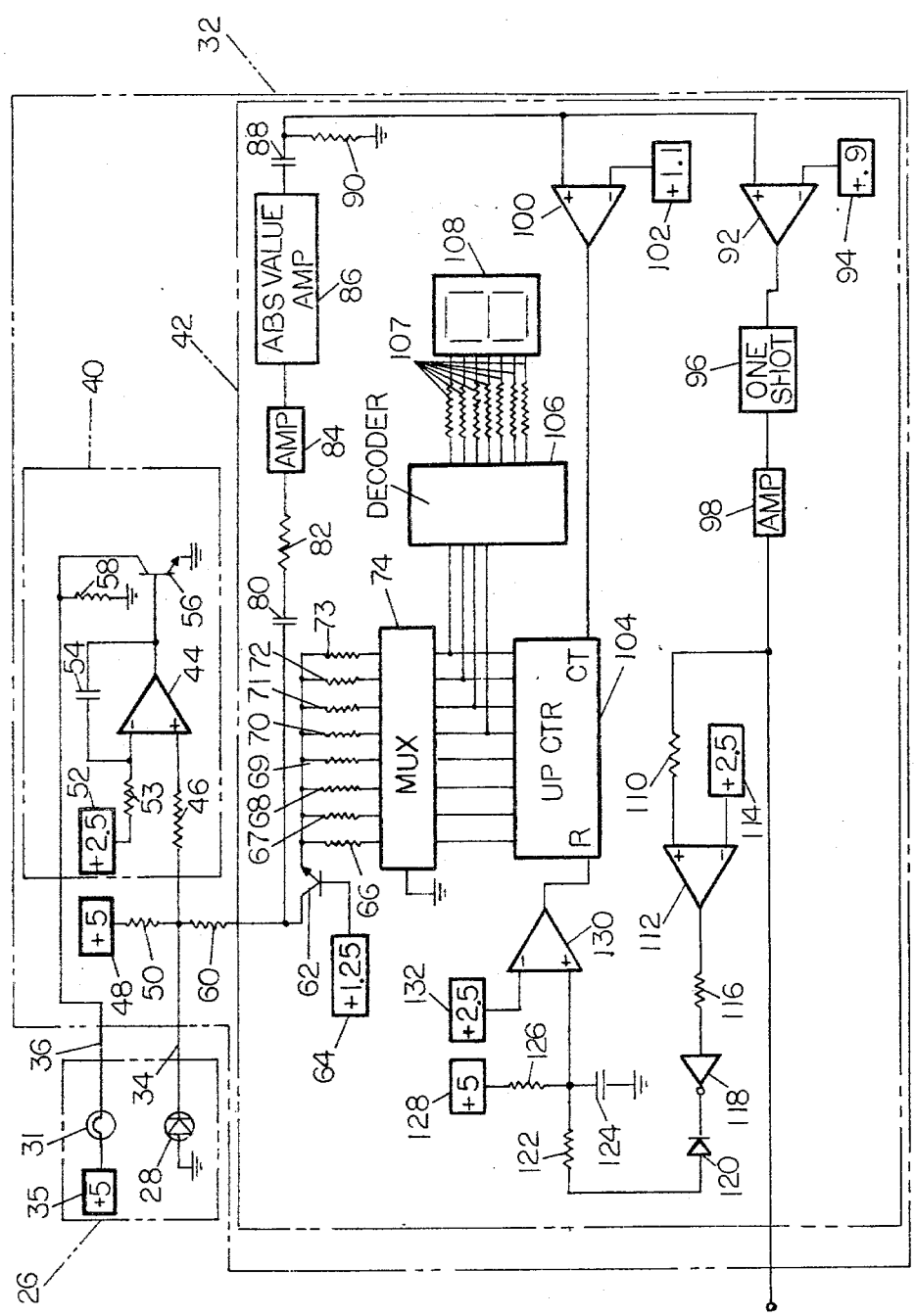
FIG. 3 is a schematic diagram of the circuit used in the scanner of the present invention.

Referring now to FIG. 3, the output line 34 of the scanner 26 (which is the output of the photodiode 28) is connected to a feedback circuit 40 and to a detection circuit 42, both of which are included in the scanner circuit 32. The line 34 is connected to supply voltage 48 through a resistor 50, to the positive input of a voltage comparator 44 through a resistor 46, and to a resistor 60. A reference voltage 52, whose value is lower than that of the supply voltage 48 is connected through a resistor 53 (identical to the resistor 46) to the negative input of the comparator 44. A capacitor 54 is connected between the output of the comparator 44 and the negative input of the comparator 44 in order to slow down the response of the comparator 44 and thus make it compare the average voltage at the positive input with the reference voltage 52 (i.e., the voltage attributable to reflections from the track 24). The output of the comparator 44 is connected to the base of an NPN transistor 56. The emitter of the transistor 56 is connected to ground, while the collector of the transistor 56 is connected to the lamp 31 via the line 36. A resistor 58 is connected between the collector of the transistor 56 and ground.

The operation of the feedback circuit 40 is as follows. When the output of the photodiode 28 is at a normal level, the voltage at the positive input of the comparator 44 will exceed the reference voltage 52 at the negative input and the output of the comparator 44 will be on. This in turn causes transistor 56 to be turned on which provides a low impedance path to ground for a voltage supply 35 which is connected to the lamp 31. As the average level of light received by the photodiode 28 increases, the voltage at the positive input of the comparator 44 will drop below the reference voltage 52, thus causing the comparator 44 to turn off. The voltage 52 is chosen so that the comparator 44 will turn off before the photodiode 28 saturates. This causes the transistor 56 to be switched off, and the voltage source 35 will then be shunted only through the resistor 58 to ground. This decreases the voltage across the lamp 31 which in turn decreases the brightness of the lamp 31. Thus, whenever too much light is being received by the photodiode 28, the circuit 40 automatically reduces the intensity of the lamp 31. When the light striking the photodiode 28 is reduced the output current will also reduce and the comparator 44 will eventually turn back on, thus increasing the brightness of the lamp 31 back to its original level.

Referring further to FIG. 3, the resistor 60 is connected to a capacitor 80 and to the collector of a transistor 62. A supply voltage 64 of relatively low value is connected to a base of the transistor 62, causing the transistor 62 to be continuously switched on and to have a constant voltage at its emitter. The emitter of the transistor 62 is connected to a group of eight parallel resistors 66 through 73, which are in turn connected to a multiplexer 74. The multiplexer 74 is addressed so as to cause one or more of the resistors 66 through 73 to be connected to ground. Thus, a portion of the current passing through the resistor 60 will be shunted through the transistor 62 and through a combination of one or more of the resistors 66 through 73. Since the collector current through the transistor 62 is a function of the emitter to ground resistance and the base voltage 64, the resistors 66-73 may be addressed in order to change the emitter to ground resistance and control the collector current through the transistor 62. The remaining portion of the current which passes through the resistor 60 is a.c. coupled through a capacitor 80 and resistor 82 to an amplifier 84. The capacitor 80 has a time constant which is long compared to a pulse which is generated when an eyemark 20 is detected. This prevents the trailing edge of the pulse from having any effect on the detection circuit. The amplifier 84 is a voltage amplifier which has a quiescant output voltage. The output of the amplifier 84 is connected to the input of an absolute value amplifier 86, whose output is a function the deviation of the output of the amplifier 84 from its quiescant level (either up or down). That is, whenever the output of the amplifier 84 increases or decreases with respect to its quiescant value the output of the absolute value amplifier 86 will increase a proportional amount.

The output of the absolute value amplifier 86 is coupled via a capacitor 88 and a resistor 90 to a pair of comparators 100 and 92. The capacitor 88 and resistor 90 prevent the output voltage of the absolute value amplifier 86 from building up over a period of time. A reference voltage 94 is connected to the negative input of the comparator 92, and a reference voltage 102 is connected to the negative input of the comparator 100. The voltage 102 is somewhat larger than the voltage 94 (1.1 V and 0.9 V respectively in the present embodiment of the invention). Whenever the output of the absolute value amplifier 86 exceeds the reference voltage 94, the comparator 92 will turn on and cause a one shot 96 to generate a pulse. The output of the one shot 96 is connected to an amplifier 98, which is the output of the scanner circuit 32, and is connected to the registration control circuit 38. Therefore, a pulse will appear at the output of the amplifier 98 whenever an eyemark 22 is detected by the scanner 26.

If the contrast between the track 24 and eyemarks 22 is great, the output of the absolute value amplifier 86 will greately exceed the reference voltage 94 (i.e., the voltage swing of the amp 84 is great). If the voltage exceeds the reference voltage 102, the comparator 100 will turn on and cause a counter 104 to make one count. The output of the counter 104 is connected to the multiplexer 74 and controls the addressing of the multiplexer 74. The resistors 66 through 73 having differing values, and the counter 104 causes the multiplexer 74 to connect succeedingly lower values of resistance to ground as the counter 104 counts up. This causes more current to flow through the collector of the transistor 62 and thus decreases the current to the capacitor 80. The counter 104 therefore provides an automatic sensitivity adjustment for the detection circuit 42. That is, when the output of the absolute value amplifier 86 is very high, indicating a high contrast between the track 24 and eyemarks 22 the counter 104 counts up, with the resulting decrease in the current to the capacitor 80, which in turn decreases the output of the absolute value amplifier 86. The counting process continues until the output of the absolute value amplifier 86 no longer exceeds the value of the reference voltage 102.

The effect of shunting an increasing amount of current through the transistor 62 is to require a greater output from the photodiode 28 to cause the output of the absolute value amplifier 86 to exceed the reference voltage 94 and thus cause an output pulse to be generated by the amplifier 98. The sensitivity of the circuit is therefore adjusted automatically depending upon the contrast between the track 24 and the eyemarks 22. The higher the count in the counter 104, the greater is the contrast between the track 24 and eyemarks 22. In the present embodiment of the invention the counter has 99 possible counts. Every tenth count is registered on a seven segment LED display 108 which is driven through seven resistors 107 by a decoder 106 which is connected to the output of the counter 104. The display 108 thus gives an indication of the relative contrast between the track 24 and eyemarks 22. Thus an indication of 0 to 1 on the display 108 signifies that there is low contrast and that the circuit is operating at or near its maximum sensitivity level. A signal of 8 or 9, however, indicates a very high contrast and that the circuit is operating at a very low sensitivity level.

Referring further to FIG. 3, incorporated within the circuit are means for automatically resetting the counter 104 is a predetermined amount of time passes without sensing an eyemark. The output of the amplifier 98 is fed to the positive input of a comparator 112 through a resistor 110. A supply voltage 114 is connected to the negative input of the comparator 112. The value of the supply voltage 114 is such that when an eyemark is sensed and the output of the amplifier 98 goes high, the voltage at the positive input of the comparator will exceed that at the negative input thus causing it to switch from an off state to an on state. The output of the comparator 112 is connected to a resistor 116 which is in turn connected to an inverter 118. Since the output of the comparator 112 is low when no eyemark is sensed, the output of the inverter will be high during such a period and low when an eyemark is present. The output of the inverter 118 is connected to the cathode of a diode 120. The anode of the diode 120 is connected to a resistor 122 which is in turn connected to a capacitor 124, a resistor 126 and the positive input of a comparator 130. A supply voltage 128 is connected to the resistor 126 and serves to charge the capacitor 124. A reference voltage 132 is connected to the negative input of the comparator 130, and the output of the comparator 130 is connected to the reset input of the counter 104.

In normal operations the capacitor 124 will not be charged to a value greater than the reference voltage 132 by the supply voltage 128. The value of the capacitor 124 is such that under normal circumstances the voltage across it will not attain the value of the reference voltage 132 during the time between the sensing of two adjacent eyemarks. If an amount of time passes which is greater than would normally be the case if eyemarks were being sensed to properly, the voltage across the capacitor 124 will attain a value above the reference voltage 132, causing the comparator 130 to turn on and thus resetting the counter 104. When an eyemark is detected the inverter 118 goes low, thus discharging capacitor 124. If an eyemark 22 is detected before the voltage across capacitor 124 exceeds reference voltage 132, the capacitor 124 never attains sufficient voltage to turn on comparator 130 and the counter 104 is not reset. The resetting of the counter 104 causes the circuit to return to its maximum sensitivity position, so that the circuit will then respond to marks having lesser contrast than it would at the previous sensitivity position. Therefore, if for some reason the contrast between the track 24 and eyemarks 22 should decrease over a period of time the circuit will automatically increase its sensitivity so as to be able to continue to detect eyemarks.

What is claimed is:

1. A scanner comprising:

a light source for projecting light towards an inspection point;

a photodetector for receiving light which is reflected from said inspection point;

feedback means connected between said photodetector and said light source for automatically adjusting the intensity of said light source as a function of the average amount of light received by said photodetector so as to prevent saturation of said photodetector; and detection means connected to said photodetector for generating an output signal whenever the magnitude of change in the amount of light received by said photodetector over a predetermined time period exceeds a predetermined level.

2. A scanner comprising:

a light source for projecting light towards an inspection point;

a photodetector for receiving light which is reflected from said inspection point;

detection means connected to said photodetector for generating an output signal whenever the magnitude of change in the amount of light received by said photodetector over a predetermined time period exceeds a predetermined level; and sensitivity control means connected to said detection means for automatically varying the magnitude of change in the amount of light received by said photodetector which is required to cause an output signal to be generated by said detection means.

3. The scanner of claim 1 further including sensitivity control means connected to said detection means for automatically varying the magnitude of change in the amount of light received by said photodetector which is required to cause an output signal to be generated by said detection means.

4. The scanner of claim 3 wherein said sensitivity control means includes a visual display for indicating the relative magnitude of change in amount of light received by said photodetector which is required to cause an output signal to be generated by said detection means.

5. The scanner of claims 1, 2 or 3 wherein said light source includes a plurality of fiber optic tubes surrounding said photodetector.

6. The scanner of claim 1 or 3 wherein said feedback means includes:

a comparator connected to the output of said photodetector for comparing said photodetector output with a predetermined reference level; and switching means connected between the output of said comparator and said light source, said switching means being controlled by the output of said comparator and being utilized to switch said light source between a plurality of intensities.

7. The scanner of claim 5 wherein said switching means includes:

a transistor whose base is connected to the output of said comparator, whose emitter is connected to ground and whose collector is connected to said light source; and a resistor connected between the collector of said transistor and ground.

8. The scanner of claim 2 wherein said detection means includes:

a quiescant value voltage amplifier connected to the output of said photodetector;

an absolute value amplifier connected to the output of said voltage amplifier, the output of said absolute value amplifier being proportional to the amount of change in the output of said voltage amplifier with respect to its quiescant output;

comparator means capacitively coupled to the output of said absolute value amplifier for comparing the output of said absolute value amplifier to a predetermined value; and means connected to said comparator means for generating an output pulse whenever the output of said absolute value amplifier exceeds said predetermined value.

9. The scanner of claim 7 wherein said sensitivity control means includes means for shunting a variable portion of the output of said photodetector away from the input of said quiescant value voltage amplifier, thereby requiring a greater output from said photodetector to cause said detection circuit to generate an output pulse.

10. A system for controlling the registration of spirally wound composite cans comprising:

a mandrel for spirally winding layers of composite material, including a printed label, so as to form a composite tube;

cutting means carried on a reciprocating carriage which moves parallel to said tube, said cutting means intermittently cutting sections of said tube;

a scanner for tracking the motion of said label before it is wound onto said mandrel, said scanner including a light source for projecting light towards an inspection point, as photodetector for receiving light which is reflected from said inspection point, feedback means connected between said photodetector and said light source for automatically adjusting the intensity of said light source as a function of the average amount of light received by said photodetector so as to prevent saturation of said photodetector, detection means connected to said photodetector for generating an output signal whenever change in the amount of light received by said photodetector exceeds a predetermined level over a predetermined time period and sensitivity control means connected to said detection means for automatically varying the magnitude of change in the amount of light received by said photodetector which is required to cause an output signal to be generated by said detection means; and registration control means connected between the output of said scanner and said carriage for controlling the position of said carriage as a function of the output of said scanner.

* * * * *